(12) United States Patent  (10) Patent No.: US 8,455,795 B2
Charron  (45) Date of Patent: Jun. 4, 2013

(54) SURFACE HEATING SYSTEM AND METHOD USING HEATING CABLES AND A SINGLE FEED COLD LEAD WIRE

(75) Inventor: Philippe Charron, Boucherville (CA)

(73) Assignee: Flextherm Inc., Longueuil, QC (CA)

( * ) Notice: Subject to any disclaimer, the term of this patent is extended or adjusted under 35 U.S.C. 154(b) by 1394 days.

(21) Appl. No.: 12/153,226

(22) Filed: May 15, 2008

(65) Prior Publication Data
US 2009/0194523 A1 Aug. 6, 2009

(30) Foreign Application Priority Data

Feb. 1, 2008 (CA) .................................... 2619261

(51) Int. Cl.
H05B 3/03 (2006.01)
H05B 3/18 (2006.01)
H05B 3/56 (2006.01)
F24D 13/02 (2006.01)

(52) U.S. Cl.
USPC ........... 219/213; 219/522; 219/539; 219/541; 219/544

(58) Field of Classification Search
USPC ................... 219/538, 213, 528, 521; 392/435
See application file for complete search history.

(56) References Cited

U.S. PATENT DOCUMENTS

| | | | | |
|---|---|---|---|---|
| 2,540,295 A * | 2/1951 | Schreiber | ...................... | 219/213 |
| 2,943,289 A * | 6/1960 | Colten et al. | .................. | 338/208 |
| 2,997,568 A * | 8/1961 | Leipold et al. | ................. | 219/213 |
| 3,223,825 A * | 12/1965 | Williams | ...................... | 219/213 |
| 3,330,035 A * | 7/1967 | Pradenas | ......................... | 29/611 |
| 4,063,069 A * | 12/1977 | Peeri | ............................. | 219/545 |
| 4,185,186 A * | 1/1980 | Williams | ...................... | 219/213 |
| 4,247,756 A * | 1/1981 | Cucinotta et al. | ............. | 219/528 |
| 4,564,745 A * | 1/1986 | Deschenes | ...................... | 219/213 |
| 4,620,085 A * | 10/1986 | Horikawa et al. | ............. | 219/528 |
| 4,659,905 A * | 4/1987 | Gabrosek et al. | ............. | 219/212 |
| 4,878,332 A | 11/1989 | Drake | | |
| 4,899,031 A | 2/1990 | Dyer | | |
| 4,967,057 A * | 10/1990 | Bayless et al. | ................. | 219/213 |
| 5,380,988 A * | 1/1995 | Dyer | ............................. | 219/548 |
| 5,908,573 A * | 6/1999 | Chiles et al. | .................. | 219/545 |
| 6,049,063 A * | 4/2000 | Barber | .......................... | 219/213 |
| 6,294,768 B1 | 9/2001 | Liebich | | |
| 6,300,598 B1 | 10/2001 | Chiles et al. | | |
| 6,438,909 B2 * | 8/2002 | Birch et al. | ...................... | 52/182 |
| 6,897,417 B1 * | 5/2005 | Usselman et al. | ............ | 219/528 |
| 7,071,446 B1 * | 7/2006 | Bench | ............................ | 219/213 |
| 7,183,524 B2 * | 2/2007 | Naylor et al. | .................. | 219/528 |
| 7,566,846 B1 * | 7/2009 | Sorensen et al. | ............. | 219/486 |
| 2003/0006226 A1 * | 1/2003 | Yanagimoto et al. | ......... | 219/213 |
| 2008/0047946 A1 * | 2/2008 | Van Klompenberg et al. | ............................. | 219/213 |

* cited by examiner

FOREIGN PATENT DOCUMENTS

| | | |
|---|---|---|
| CA | 1055094 | 5/1979 |
| CA | 1107945 | 9/1981 |
| CA | 1232313 | 2/1988 |

*Primary Examiner* — Joseph M Pelham
(74) *Attorney, Agent, or Firm* — Norton Rose Canada LLP

(57) ABSTRACT

A surface heating system and method of heating a surface in which there are two or more heating cables adapted to be embedded in a cementitious material and using a single feed cold lead wire is described. One or more heating cables are provided to define one or more heating circuits. The heating cables have electrically conductive wires. A cold lead connector is secured to the electrically conductive wires at an end of the one or more heating cables. A feed cold lead wire is secured at one end to a thermostat to which is connectable an electrical supply source, and at a second end to the cold lead connector of the one or more heating cables.

9 Claims, 4 Drawing Sheets

SURFACE HEATING SYSTEM AND METHOD USING HEATING CABLES AND A SINGLE FEED COLD LEAD WIRE

TECHNICAL FIELD

The present invention relates to a surface heating system and method which is comprised of one or more heating cables, each having a cold lead connector adapted for connection to a cold lead wire secured to a thermostat and wherein all of the cold lead connectors are interconnected together whereby a single feed cold lead wire is connected to the thermostat to feed the heating cables.

BACKGROUND ART

Because heating cables have very fine wires therein, it is the current practice for the manufacture of heating cables to supply a cold lead soldered to each heating cable. The installation of heating wires is usually done by a certified electrician. The heating wires are secured in a pattern over a surface to be heated, usually a floor, and a cementitious material is poured and sets thereover. A portion of these cold lead wires are therefore embedded at one end into the cementitious material. The other end of the feed cold lead wire needs to be connected to a thermostat through which the electrical supply is regulated. One can imagine that if a surface to be heated is provided with two or more of these heating cables then two or more feed cold lead wires need to be connected to the thermostat. Because these cold lead wires have relatively heavy gauge wires, namely 12 and 14 gauge, the interconnection of several of these wires in a thermostat is not possible and often requires the installation of a further junction box. It is also necessary to run these several cold lead wires in a wall below the thermostat and this can also prove problematic.

It is a further common practice to provide heating cables in different lengths with cold lead wires of different gauges depending on the voltage rating of the supply source. Accordingly, the electricians who install these heating cables need to carry an inventory of heating cables of different lengths and also heating cables having cold lead wires of different ratings and length. Because of stringent electrical certification by the Industry, the connection between the fine wires of the heating cables to the heavier gauge wires of the cold lead wires, this connection is done by the manufacturer. Because there could be several cold leads in an installation, several connectors need to be disposed in cavities dug into the sub-floor so that they do not protrude above the heating wires when the cement slurry is poured thereover. This is accordingly a time consuming installation.

It would, of course, be desirable that the manufacturers of these heating cables supply the heating cables to installers without the cold lead wire attached thereto and wherein the installer would connect the cold leads to these heating wires without the risk of making bad electrical connections. Such would solve the problem of costs in carrying large inventories by installers. It would also be desirable to resolve the problem of having to run two or more cold wires into a thermostat.

SUMMARY OF INVENTION

It is a feature of the present invention to provide a surface heating system and method which substantially overcomes the above-mentioned disadvantages and provides the above-mentioned desirable needs.

Another feature of the present invention is to provide a surface heating system which comprises one or more heating cables, each provided with a cold lead connector and wherein a single feed cold lead wire is secured to a thermostat to feed electrical voltage to two or more cold lead connectors.

Another feature of the present invention is to provide a method of heating a surface in which there are two or more heating cables adapted to be embedded in a cementitious material and wherein a single feed cold lead wire is connected at one end to a thermostat and at a second end to a selected one of the cold lead connectors of the heating cables and wherein the other cold lead connectors are electrically interconnected to one another.

From a broad aspect, there is provided an indoor floor heating system comprising two or more heating cables each defining a heating circuit secured on a floor surface. Each of the two or more heating cables has electrically conductive wires. A cold lead connector is secured to the electrically conductive wires at an end of each the two or more heating cables. A single cold lead feed wire has a first part thereof concealed in a vertical wall adjacent the floor surface and secured at an end thereof to a thermostat mounted on the vertical wall and to which is connected an electrical supply source. The single cold lead feed wire has a second part thereof disposed on the floor surface to define a single straight cold lead floor feed wire section to be embedded in a cementitious material. The cold lead connector of each the two or more heating cables is connected to the single straight cold lead floor feed wire section wherein when the cementitious slurry has set on the floor surface all of the cold lead connectors of the two or more heating cables are accessible along the single straight cold lead floor feed wire section.

According to a further broad aspect of the present invention there is provided a method of heating an indoor floor surface in which there are two or more heating cables adapted to be embedded in a cementitious material. The method comprises the steps of securing a cold lead connector to electrically conductive wires of each of the two or more heating cables. A first part of a single cold lead feed wire is secured at one end to a thermostat mounted on a vertical wall adjacent the floor surface. The first part of the single cold lead feed wire is concealed in the vertical wall and the thermostat is connected to an electrical supply source. A second part of a single cold lead feed wire is disposed on the floor surface along a single straight path to define a floor feed wire section. The cold lead connectors of the heating cables are secured to the second part to the single cold lead feed wire and the cementitious material is then poured onto the floor surface to embed the second part of the single cold lead feed wire and the two or more heating cables. The single straight cold lead floor feed wire providing accessibility to all of said connectors of said two or more heating cables along the single straight path.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
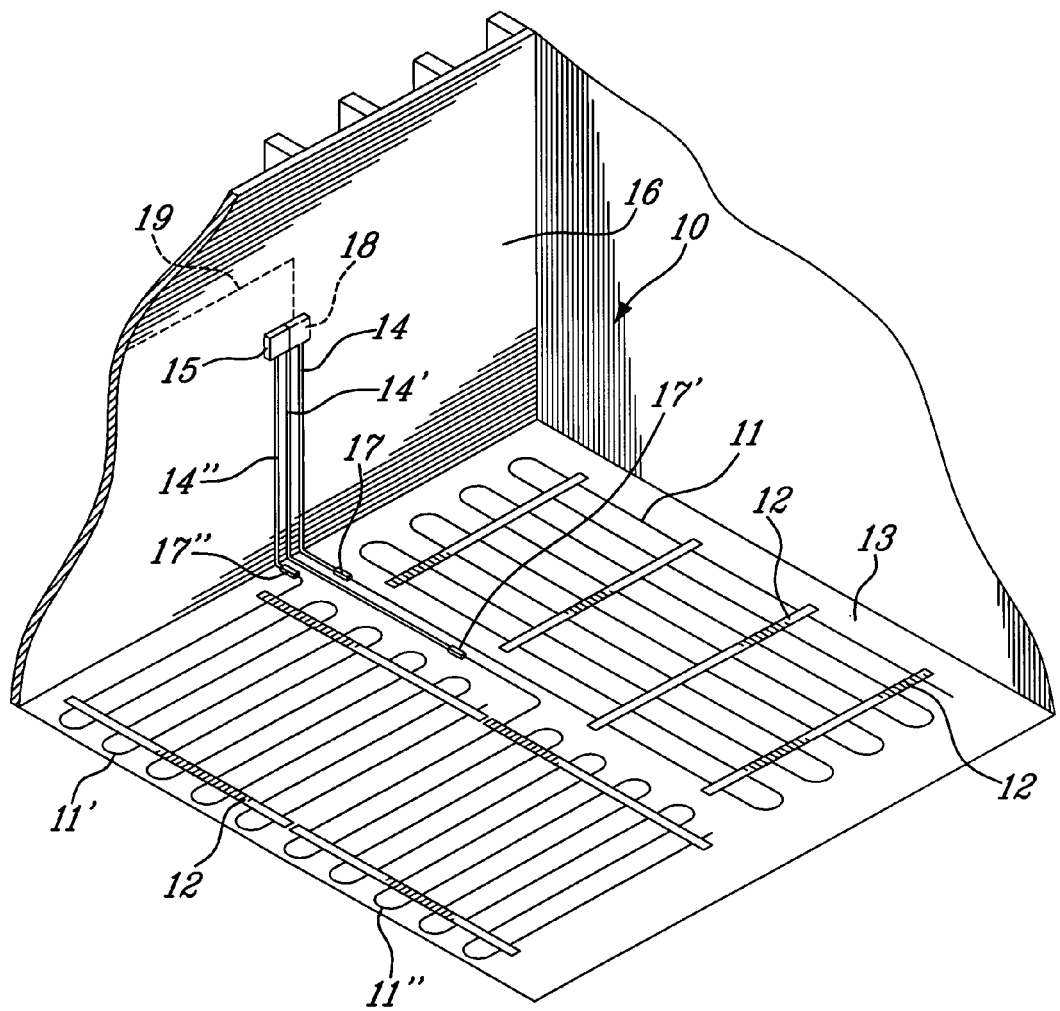
FIG. 1 is a perspective view of a surface heating system of the prior art having heating cable circuits secured over a floor surface and to a thermostat and illustrating the disadvantages of the prior art systems and method.

Referring now to FIG. 1 there is shown generally at 10 a surface heating system of the prior art which is herein comprised of three separate heating cables 11, 11' and 11" which form three distinct heating circuits. These heating cables are attached to support strips 12 which are secured to the floor surface 13. As hereinshown, each of the heating cables 11, 11' and 11" are provided with cold lead wires 14, 14' and 14" secured at an end thereof. The cold lead wire has a lower portion thereof lying against the floor surface and disposed to exit substantially below a thermostat 15 secured to a vertical wall 16 adjacent the floor 13. Also, all the connectors 17, 17' and 17" need to be embedded not to protrude above the healing cables and often this necessitates making cavities in the surface 13 of the sub-floor, which is also time-consuming. A cementitious slurry 44 (see FIG. 4) is then poured over the floor surface 13 to embed the heating cables and their connections 17, 17' and 17", into the cement. The cold lead wires 14, 14' and 14" are concealed within the frame structure of the vertical wall 16 and this is usually done during construction before the vertical wall is covered by gypsum sheets or other finishing products. Because, as herein illustrated, there are three and sometimes more feed cold lead wires, an additional electrical box 18 needs to be secured adjacent to the box which receives the thermostat 15 whereby to interconnect the cold lead wires together. A jumper wire is then used to connect to the terminals within the thermostat to couple with the electrical supply wire 19, herein indicated in phantom lines, under the control of the thermostat.

After the connections to the thermostat are made, and before the cementitious slurry is poured, it is necessary to inspect the connections 17, 17' and 17" to assure that these have not been broken during the installation due to the fine gauge of the wires in the heating cables 11, 11' and 11". Because these installations are usually made on a construction site, one can appreciate that there is always traffic of workers in the area of the electrical heating floor installation and this could cause one of the connections 17, 17' and 17" to break. When these breaks occur after installation and inspection, they are not usually detected by the person who installs the cementitious slurry over the wired floor. Accordingly, a short circuit may be concealed in the cement floor and may only be detected once the heated floor is re-tested well after the cement floor has set and a finish product, such as ceramic tiles, has been secured over the set cement floor. To locate the short circuit in the cement, conductivity detectors are required and it is then necessary to break the floor to fix the connection. Often when the floor is repaired it leaves a visible indicator of such repair due to the fact that the grout between the tiling, or the tile itself, may not be identical to the one as originally installed and thus providing an inferior finished surface.

With reference now to FIGS. 2 to 5, there will be described the surface heating system and method of the present invention which overcomes the above-mentioned disadvantages of the prior art, as illustrated by FIG. 1.

Figure 2:
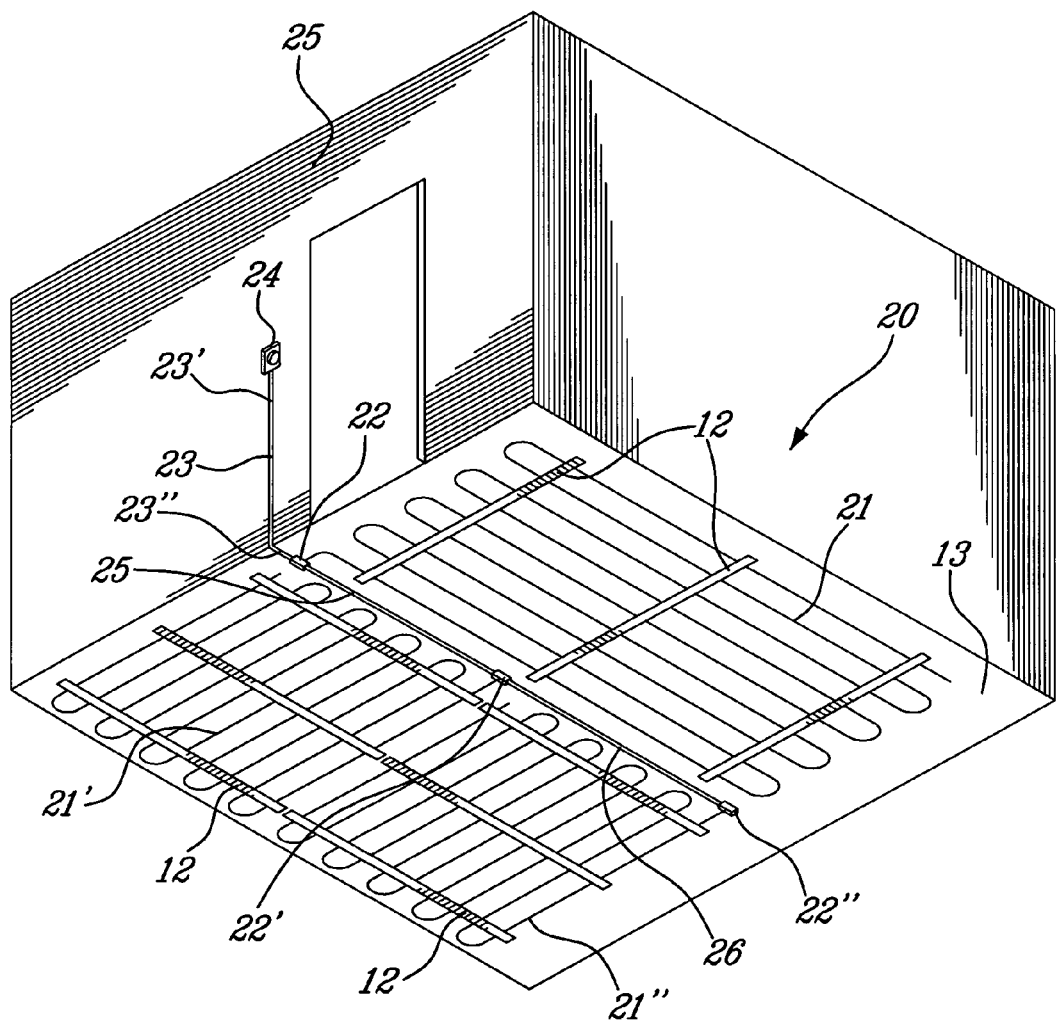
FIG. 2 is a perspective view similar to FIG. 1 but illustrating the improved surface heating system of the present invention and wherein each heating cable circuit has a cold lead connector with one of the connectors secured to a single cold lead from the thermostat and the other connectors interconnected together by intermediate cold lead wire sections.

As shown in FIG. 2, the surface heating system 20 of the present invention comprises one or more, herein illustrated three, heating cables 21, 21' and 21", each defining a heating circuit and each having electrically conductive wires, not shown but obvious to a person skilled in the art which are secured to cold lead connectors 22, 22' and 22", respectively, at an end of each of the heating cables. A single feed cold lead wire 23 is secured at one end 23' to a thermostat 24 secured to the vertical wall 25 and at a lower end 23" to one of the cold lead connectors 22, herein the one closest to the thermostat 24 on the vertical wall 25. Because these cold lead connectors 22, 22' and 22" are secured to the heating cables by the manufacturers, this ensures that there is no breakage of the electrically conductive wires of the heating cables which are fine gauge. Because there is provided a single cold lead wire 23, the connection to the thermostat is simple with ample room for the cold lead wire and the wiring within the wall 25 is also simple as there is only one wire between the thermostat to feed the different heating cable circuits.

As illustrated in FIG. 2, the different cold lead connectors 22, 22' and 22" may be located at different locations over the floor surface depending on the disposition layout of the heating cables. The connectors are of a type to provide foolproof connections with the heavier gauge leads of the cold lead wire 23. Also, sections of cold lead wires, herein sections 25 and 26 are used to form the intermediate feed line between the connectors 22, 22' and 22". Such wire is usually found in the inventory of electricians in roll form. Accordingly, with this system and method of the present invention, one can appreciate that it is now possible for an installer, due to the flexibility of this system, to provide wires for the interconnection between the heating wires and the feed cold lead 23 leading to the thermostat 24 at any locations in the floor surface, although it is preferable to have at least one connector 22 as close as possible to the area of the thermostat, as shown in FIG. 2. Also, by running the connections in a straight line, as shown in FIG. 2, it is easier to later locate these connectors.

Figure 3:
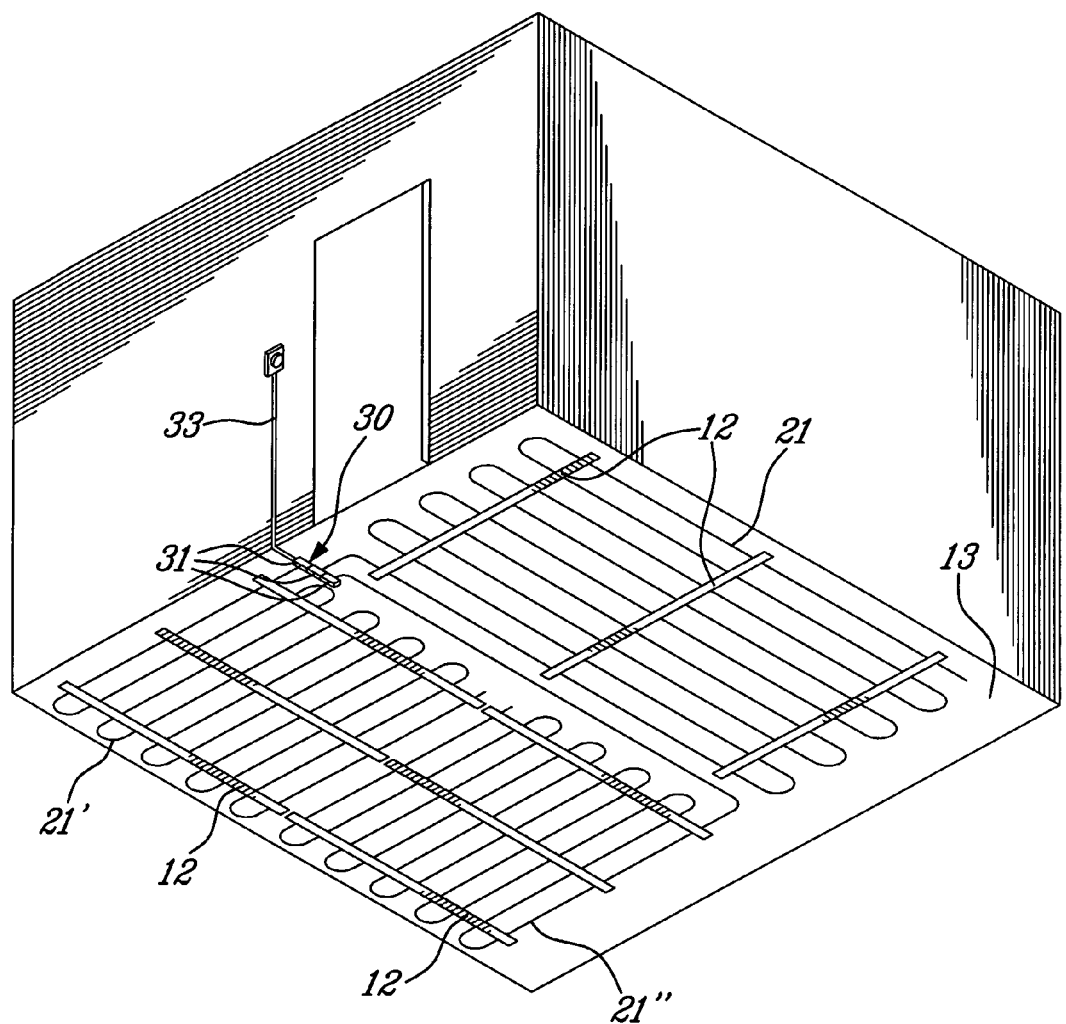
FIG. 3 is a perspective view similar to FIG. 1 but showing the use of a distribution connector to which are secured three distinct heating cables.

FIG. 3 shows a further embodiment wherein the cold lead connector 30 is a feed connector. This feed connector 30 can be constituted by a unitary connector adapted to receive connections from a plurality of heating cables, herein three heating cables 21, 21' and 21". The distribution connector 30 can also be constituted by three different connectors 31 interconnected to one another.

Figure 5:
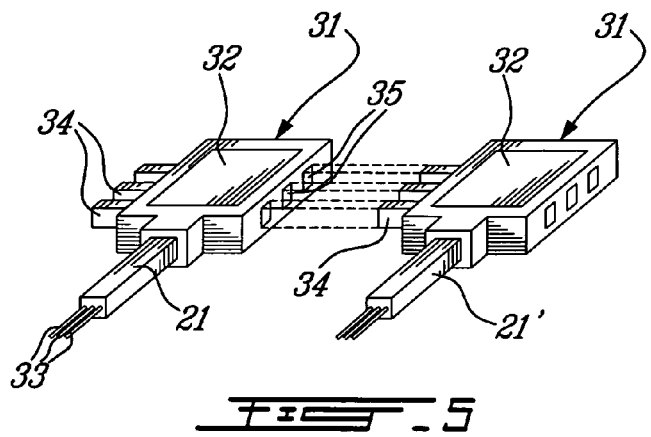
FIG. 5 is a simplified perspective view showing a cold lead connector which is provided with electrically conductive coupling means wherein the connectors can be interconnected to one another to form a distribution connector.

With reference to FIG. 5 there is shown an embodiment of interconnectable connectors 31, and as hereinshown they are constituted by a flat connector housing 32, each receiving the fine wires 33 of their associated heating cables, herein cables 21 and 21, for connection therein. These connections can be made by soldering or other manner such as a snap-fit connection between sections of the housings 332. Each housing 32 is also provided with electrically conductive coupling means which are herein constituted by metal prongs 34 projecting from one side of the housing and adapted to be received in connecting sockets 35 at an opposed side of the housing 32 whereby these individual connectors 31 are secured together end-to-end, such as shown in the embodiment of FIG. 3.

Figure 4:
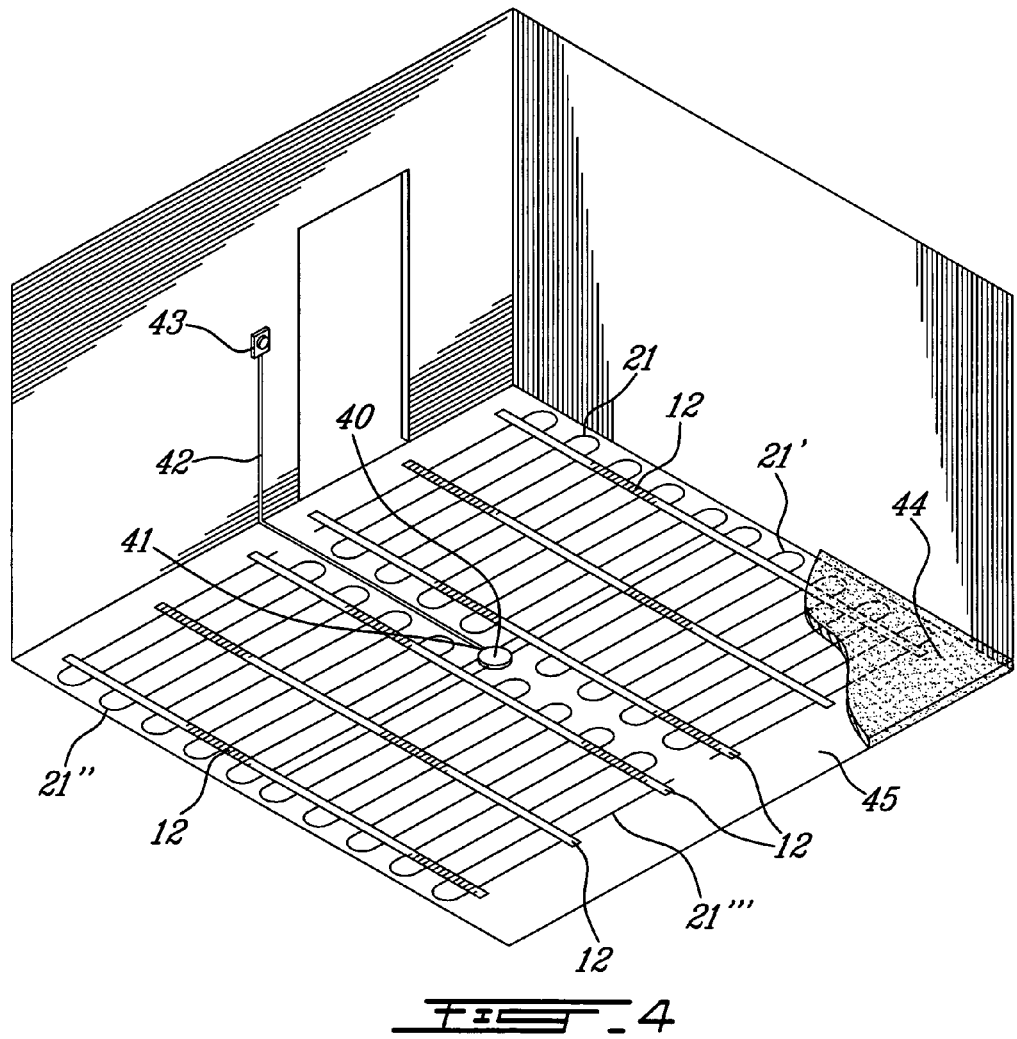
FIG. 4 is a view similar to FIG. 2 but illustrating four different heating cables secured to a central distribution connector to which a single cold lead wire is secured.

With reference now to FIG. 4, there is shown a still different version of a distribution connector 40 which is herein constituted by a central junction box 41 in which the connecting ends of four different heating cables 21, 21', 21" and 21'" connect to the leads of a single feed cold lead wire 42. For this type of connection box the ends of the leads of the heating cables may be provided with a metal prong which may be easily friction-fit connected to wire connectors associated with the conductive leads of the cold lead wire 42. As shown, the single cold lead wire is secured at one end to the thermostat 43 and at its opposed end to the junction box 41 which is centrally located and adapted to be embedded in cementitious material 44 which is poured over the floor surface 45 after all the connections are made and inspected. Again, this type of arrangement makes it very easy to locate all of the connections to the terminals of the heating cables and the cold lead feed cable, if required to make repairs.

Briefly summarizing the method of heating a surface with the system of the present invention, there are provided two or more heating cables 21 which are adapted to be embedded in a cementitious material such as a material 44. It is conceivable that the embedding material 44 could also be a fire-resistant plaster material and the cables integrated over other surfaces than a floor surface. A cold lead connector is secured to the electrically conductive wires of each of the heating cables. A single feed cold lead wire is secured at one end to a thermostat which is connectable to an electrical supply source. A second end of the feed cold lead wire is secured to a selected one of the cold lead connectors of the heating cables. An electrically conductive means, herein constituted by a distribution cold lead connector, or several connectors interconnected by cold lead feed wire sections, or interconnected cold lead connectors, couple all the cold lead connectors together.

It is within the ambit of the present invention to cover any obvious modifications of the preferred examples described herein, provided such modifications fall within the scope of the appended claims.

I claim:

1. An indoor floor heating system comprising two or more heating cables each defining a heating circuit secured on a floor surface, each said two or more heating cables having electrically conductive wires, a cold lead connector secured to said electrically conductive wires at an end of each said two or more heating cables, a single cold lead feed wire having a first part concealed in a vertical wall adjacent said floor surface and secured at an end thereof to a thermostat mounted on said vertical wall which is connected to an electrical supply source, said single cold lead feed wire having a second part thereof disposed on said floor surface to define a single straight cold lead floor feed wire section to be embedded in a cementitious material, said cold lead connector of each said two or more heating cables being connected to said single straight cold lead feed wire section wherein when said cementitious slurry has set on said floor surface all of said cold lead connectors of said two or more heating cables are accessible along said single straight cold lead floor feed wire section.

2. An indoor floor heating system as claimed in claim 1 wherein said cold lead connector is a distribution connector to which is connected said electrically conductive wire of each said heating cables.

3. An indoor floor heating system as claimed in claim 2 wherein said second part of said single feed cold lead wire is secured at a free end thereof to said distribution connector, said distribution connector being located substantially in a central region of said floor surface.

4. An indoor floor heating system as claimed in claim 1 wherein said cold lead connector of each said one or more heating cables is provided with electrically conductive coupling means whereby two or more of said cold lead connectors are coupled to one another in an electrically conductive manner and to said second part of said cold lead feed wire.

5. An indoor floor heating system as claimed in claim 1 wherein said cold lead connector of each said two or more heating cables are secured to said second part of said single feed cold lead wire in spaced-apart relationship.

6. A method of heating an indoor floor surface in which there are two or more heating cables adapted to be embedded in a cementitious material, said method comprising the steps of:
   i) securing a cold lead connector to electrically conductive wires of each said two or more heating cables,
   ii) securing a first part of a single cold lead feed wire at one end to a thermostat mounted on a vertical wall adjacent said floor surface, said first part of said single cold lead feed wire being concealed in said vertical wall and said thermostat being connected to an electrical supply source,
   iii) disposing a second part of said single cold lead feed wire on said floor surface along a single straight path to define a floor feed wire section,
   iv securing said cold lead connectors of said heating cables to said second part of said single cold lead feed wire,
   v) pouring said cementitious material on said floor surface to embed said second part of said single cold lead feed wire and said two or more heating cables, and
   vi) providing accessibility to all of said cold lead connectors along said single straight path of said second part of said single cold lead feed wire.

7. A method as claimed in claim 6 wherein said step (iv) comprises connecting said cold lead connector of each said two or more heating cables spaced-apart along said single straight path of said second part of said single cold lead feed wire.

8. A method as claimed in claim 6 wherein said cold lead connector is a distribution connector and wherein there is further provided the step of connecting a free end of said second part of said single cold lead feed wire to said distribution connector.

9. A method as claimed in claim 6 wherein said cold lead connectors of said two or more heating cables are each provided with electrically conductive coupling means, and wherein after step (i) there is further provided the step of securing said cold lead connectors together through said electrically conductive coupling means to provide an electrically conductive path through all of said cold lead connectors, and securing a free end of said second part of said single cold lead feed wire to one of said cold lead connectors secured together.

* * * * *